Jan. 5, 1937.  C. E. HAWKE  2,067,085
RETORT AND RETORT SETTING
Filed Oct. 30, 1935  4 Sheets-Sheet 1
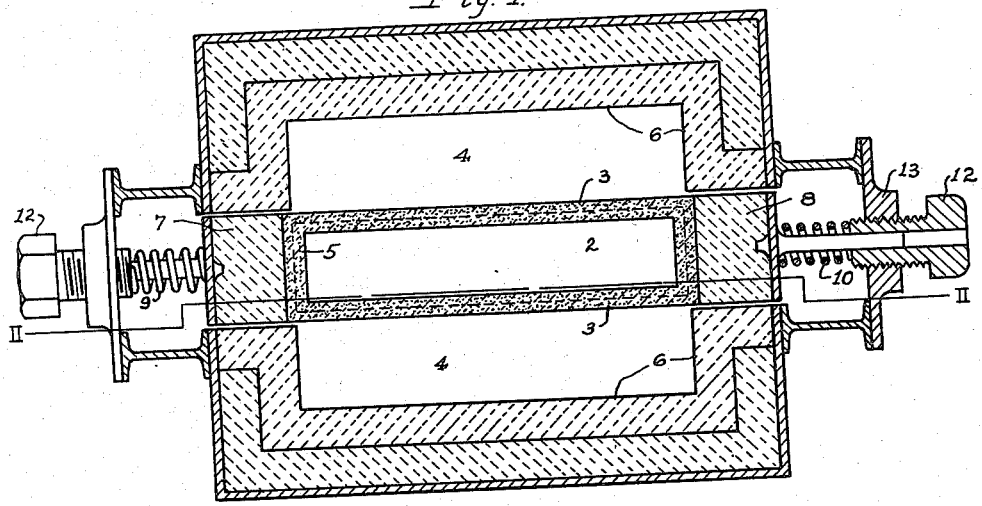
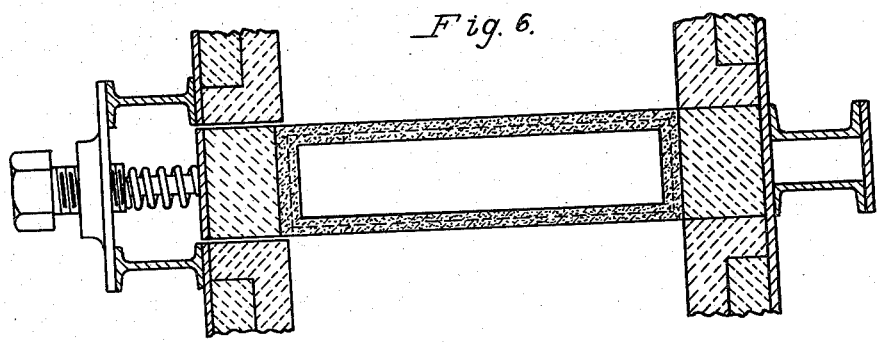
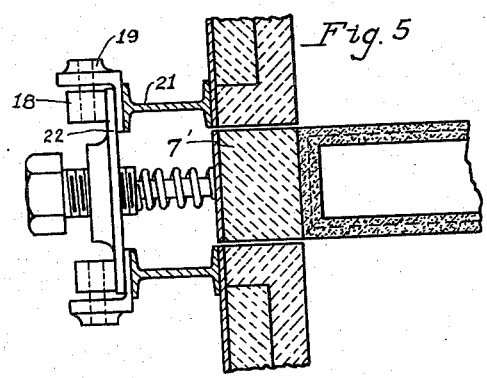
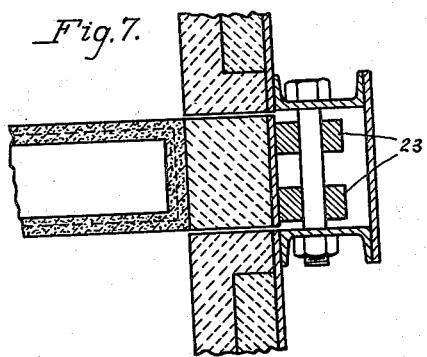
INVENTOR.
CLARENCE E. HAWKE
BY
ATTORNEY.

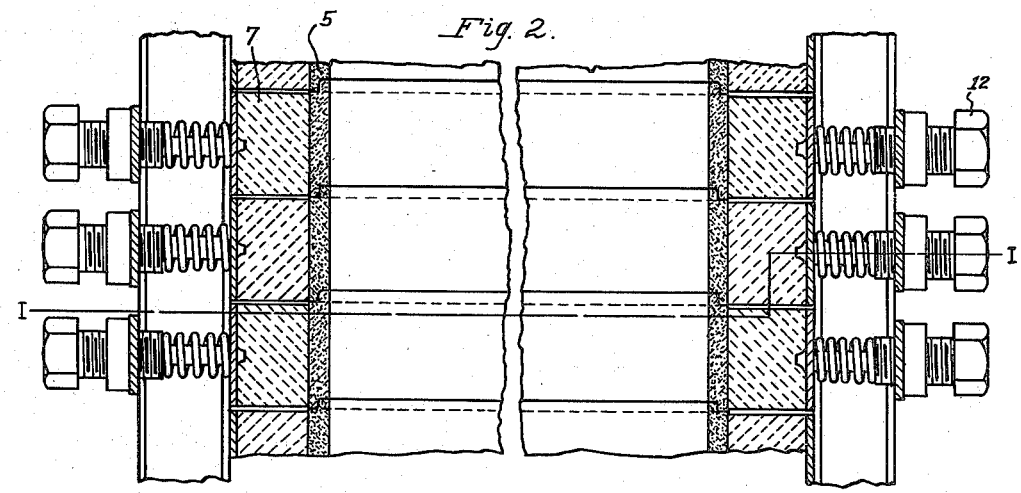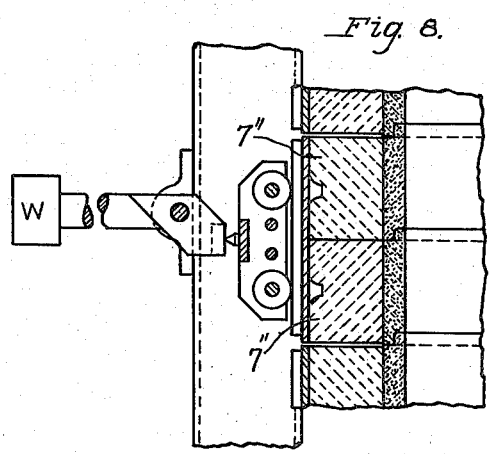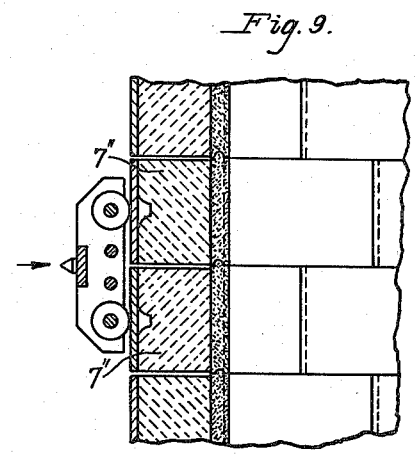

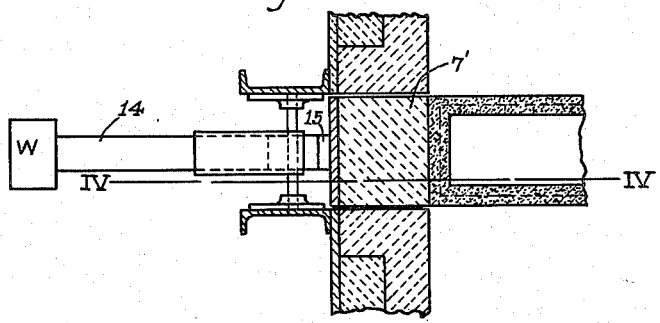
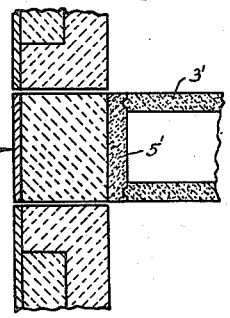
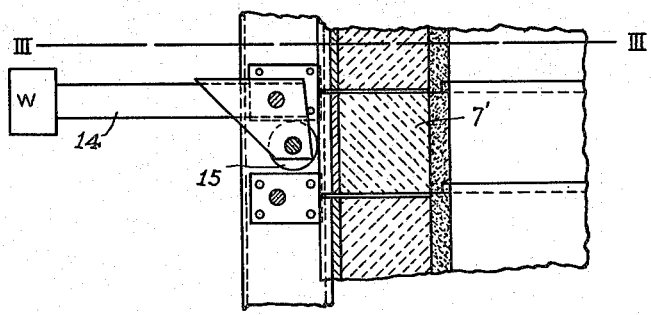
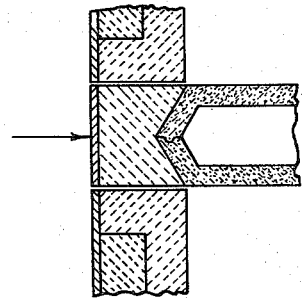
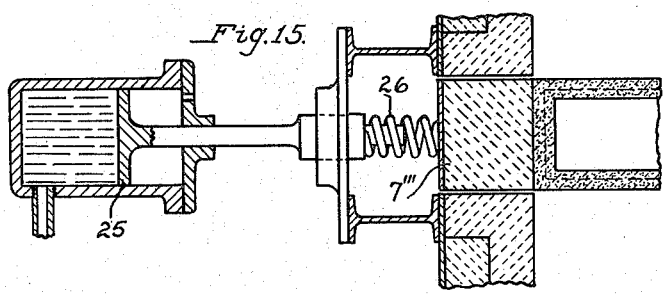
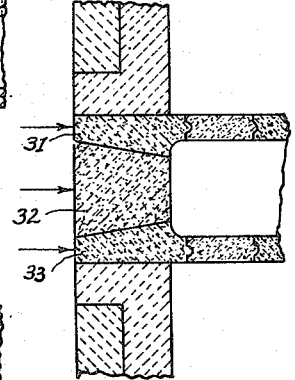
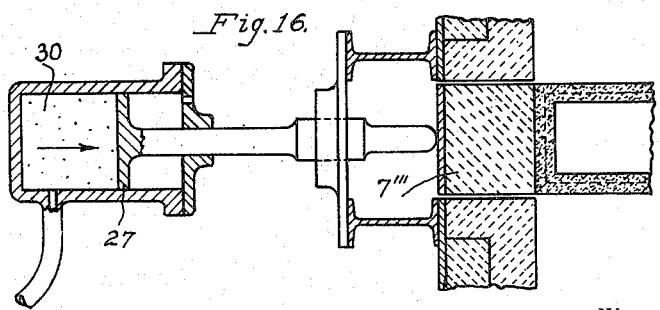

Jan. 5, 1937.   C. E. HAWKE   2,067,085
RETORT AND RETORT SETTING
Filed Oct. 30, 1935   4 Sheets-Sheet 4
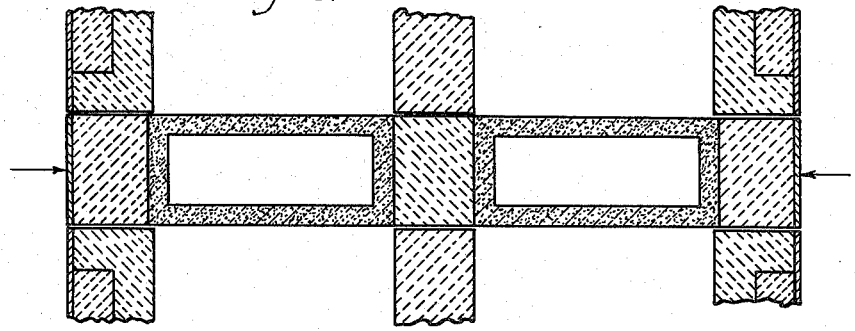
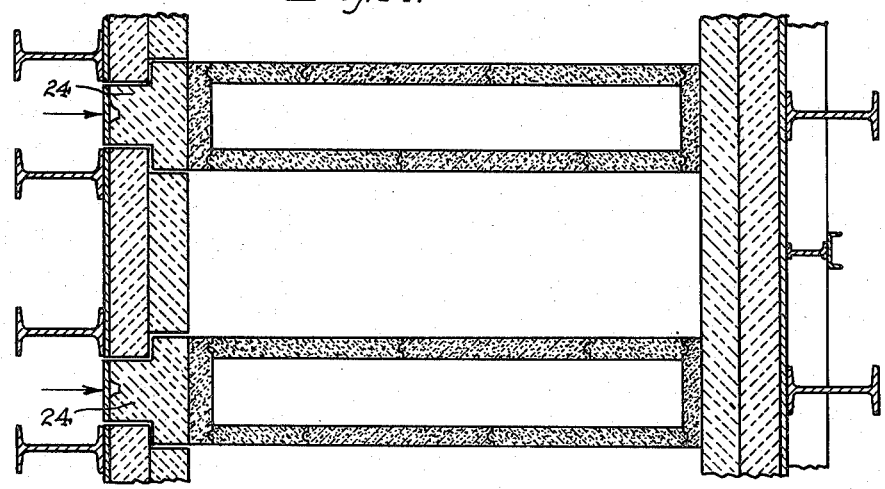
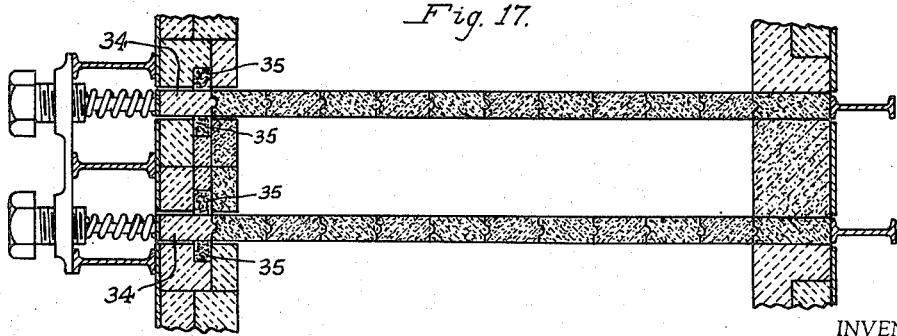
INVENTOR.
CLARENCE E. HAWKE
BY
ATTORNEY.

Patented Jan. 5, 1937

2,067,085

UNITED STATES PATENT OFFICE 2,067,085

RETORT AND RETORT SETTING

Clarence E. Hawke, Metuchen, N. J., assignor, by mesne assignments, to The Carborundum Company, Niagara Falls, N. Y., a corporation of Delaware Application October 30, 1935, Serial No. 47,381

7 Claims. (Cl. 263—37)

This application relates to improvements in retorts and retort settings. More particularly the application is concerned with vertical retorts composed of non-metallic refractories, and used for metallurgical purposes or for the calcination of minerals.

In such processes as have been indicated above, gases or vapors are often given off in great abundance as in the case of the refining of zinc or in the calcining of limestone. There are many difficulties in maintaining a reasonably gas or vapor tight structure in metallurgical and other retorts during prolonged periods of operation, especially where it is necessary to use nonmetallic retorts.

Non-metallic refractories are extensively used where resistance to change of shape at high temperatures and chemical inertness at high temperatures are required. It is not possible to construct a retort of non-metallic refractory materials that will be absolutely gas or vapor tight. Retorts can be built up of non-metallic refractory elements consisting of superimposed hollow one-piece sections. The walls of a retort can also be built up by using combinations of refractory shapes with both horizontal and vertical joints which can be lapped or which can have tongue and groove connections. The sections or elements of a retort can also be cemented together. Such structures can be made reasonably tight and will show little or no gas or vapor leakage, provided pressures are balanced within an inch or two of hydrostatic pressure. Such retorts, however, will not stand prolonged periods of operation without developing leaks either through the opening of the vertical joints, or because of the development and opening of cracks in the body of the refractories employed.

I have discovered that, in retorts of the type just described, little or no trouble is caused by the opening of horizontal joints or by the development or opening of cracks extending in a horizontal direction. This is due to the fact that the load imposed upon the refractory elements by the upper portion of a retort (including the portion of the retort which extends beyond and above the heating chamber) prevents the opening of horizontal joints or cracks and the development and opening of cracks extending in a horizontal direction.

Among the refractories which are most useful for high temperature work may be mentioned silicon carbide, which has a high thermal conductivity (for a non-metallic refractory) and which retains great strength to compressive loads at the temperatures to which retorts are ordinarily subjected. This characteristic permits the use of this material in thin sections. Even this refractory is liable, however, to the development of hair-line cracks during prolonged periods of operation in which strains are produced by non-uniform heating or by rapid changes in temperature or by changes in local pressure. Such causes are likely to produce changes in volume which are not uniform throughout a given refractory element. The strains so produced must be relieved, and are relieved when the refractory element cracks or fractures. These cracks may not be visible when they first occur on account of the minute thickness of the opening produced. They will open up to a greater extent during prolonged periods of heating unless some force is applied to prevent the opening.

In the case of a vertical retort therefore, the fine cracks which occur in a horizontal direction are not likely to open up to any serious extent because of the superincumbent weight which tends to close the openings. The case is quite different with vertical cracks. This invention is concerned principally with the development of practical means for preventing vertical cracks from opening up in retorts built of non-metallic refractory.

For purposes of illustration my invention is described with reference to vertical retorts having a rectangular cross-section. The type of retort has long sides (as illustrated in the accompanying drawings) and narrow ends, the heat being transmitted from sources of heat situated outside of the opposite side walls.

In the accompanying drawings:

Figure 1 shows a horizontal section of a retort mounted in a furnace, the section being taken on the line I—I of Fig. 2;

Figure 2 is a fragmentary sectional elevation taken on the line II—II of Fig. 1;

Figure 3 is a fragmentary horizontal section taken on the line III—III of Fig. 4 and illustrating a modification of the means used for applying pressure to the end walls;

Figure 4 is a fragmentary sectional elevation taken on the line IV—IV of Fig. 3;

Figure 5 is a fragmentary horizontal section illustrating means for facilitating movement of a compression member in a vertical direction, where such movement is desirable to reduce stresses resulting from temperature changes;

Figure 6 shows a horizontal section of a retort in which means for exerting a resilient pressure are applied only at one end of the retort;

Figure 7 is a fragmentary horizontal section illustrating means for supporting the end wall at the right of Figure 6 in a manner which facilitates movement of this wall in a vertical direction to relieve stresses in this part of the wall;

Figure 8 is a fragmentary vertical section illustrating means by which horizontal force can be applied simultaneously in like manner to two end wall elements;

Figure 9 is a fragmentary sectional elevation illustrating means by which horizontal forces can be applied simultaneously in like manner to two compression blocks, these two blocks being shown as slightly separated from each other;

Figure 10 is a fragmentary horizontal section illustrating a retort constructed from tiles with vertical joints between individual tiles or groups of tiles;

Figure 11 is a fragmentary horizontal section in which there is shown a pressing block shaped to close a vertical joint in the adjacent end wall of the retort;

Figure 12 is a fragmentary horizontal section showing a form of retort in which horizontal pressures applied to an end of the retort tend to close the vertically disposed joints in the side wall and also vertically disposed joints in the end wall;

Figure 13 is a horizontal section showing two retorts whose adjacent ends are pressed against a common support by means of forces directed against the respective opposite ends of the retorts;

Figure 14 is a fragmentary horizontal section illustrating a plurality of retorts with vertical joints, the retorts being in parallel and horizontal pressure being directly applied to one end of each retort while there is a rigid support for the opposite end.

Figure 15 is a horizontal section illustrating hydraulic means for applying pressure through a spring to a compression block;

Figure 16 is a horizontal section illustrating pneumatic means for applying pressure to a compression block; and Figure 17 is a horizontal section of a retort showing side walls which are independently movable with respect to intermediate end sections and showing means for applying horizontal pressure to each side wall independently.

Referring to the drawings in detail there is shown in Figure 1 an elongated retort 2 whose sides 3 are made as long as practicable. Heat is transmitted to the material inside the retort through these long sides from combustion chambers 4. The distance between the side walls of the retort may vary from 2 inches to 18 inches depending upon the process involved. The effective heating of the material within the retort will not be much affected by the length of the walls 3, that is by the horizontal dimensions of the heating surfaces exposed to the combustion chambers. On the other hand if the distance inside the retort between the side walls is too great, the materials near the wall of the retort will be overheated before the materials in the center of the retort reach the desired temperature. The optimum distance between the side walls will depend on the thermal conductivity of the materials under treatment.

It has been found that little or no trouble occurs through cracking of the refractories in the end walls 5 since these walls are not exposed to the combustion gases and are also of relatively small horizontal dimensions, so that it is not usually necessary to use vertical joints in these end walls 5. The difficulties described above have been experienced in the side walls 5 which are usually several feet in length and which therefore have to be built up from tiles with vertical as well as horizontal joints. While in some of the views the retorts have been indicated without vertical joints, vertical cracks are likely to form during the operation of the retorts. One of the objects of the present invention is to prevent such cracks from opening up.

For efficient operation the side walls of the retort have to be built of a material having a high thermal conductivity while the walls 6 of the combustion chamber are built of a poorly conducting refractory such as fire-clay. As these two types of materials have in general different rates of expansion, it is essential that the retort should not be rigidly tied in with the structure of the setting, for if this is done the entire retort structure may be subjected to such strains as will cause destructive cracking of the refractories and the opening up even of horizontal joints. It is impractical therefore to hold the retort in compression from the sides by rigidly tying the retort structure in with the structure of the setting.

In the practice of my invention I apply pressure in a horizontal direction to either one or both of the narrow ends of the retort by compression means attached to the outside structure of the retort setting. For example in Figure 1 the movable blocks 7 and 8 are urged toward the respective ends of the retort by means of the springs 9 and 10. The amount of compression in the springs may be adjusted, for example by rotation of the member 12 which is threaded in the cap 13. As indicated in Figure 2 individual pressure-applying means may be used on a number of superimposed tiles in the end walls.

In the modification shown in Figures 3 and 4 the end walls of the retort are pressed with the aid of blocks 7', which in turn are pressed by means of weighted levers such as that indicated at 14. Pneumatic or hydraulic pressure devices may also be utilized, the hydraulic pressure being cushioned by means of a spring or by means of compressed air.

Horizontal forces should be applied to a sufficient number of the end wall elements to prevent any vertical cracks or joints from opening up in the side walls as the result of internal pressures produced by the load in the retort or by the development of gases or produced as the result of the expansion and contraction of refractories when heated and cooled through extensive ranges of temperature. The means used for applying these horizontal forces must be flexible enough to absorb the normal expansion of the refractories caused by the application of heat thereto and also flexible enough to maintain the horizontal pressure in the event of any contraction due to cooling. In the case of the modification shown in Figures 3 and 4 the horizontal forces are applied through rollers 15 which are rotatably mounted in a lower extension of the lever 14. The end walls are therefore not prevented from vertical expansion or contraction by their contact with the pressure-applying means. Where no such rollers are shown (as in Figures 1 and 2) the application of horizontal forces can be omitted during the heating up period until the retort is brought to operating temperature. The horizontal forces are then applied by tightening up on the threaded bolts 12 until the desired compressive force is obtained. With this arrangement the spring pressure should be released before the retort is cooled.

In the modification shown in Figure 5 provision is made for the movement of the compression member 7' in a vertical direction. In this case the rollers 18 are carried by brackets 19 which are in turn securely attached to the supporting members 21 of the retort setting. The plate 22 (to which the compression member 7' is attached) is thus permitted to move in a vertical direction during expansion or contraction of the retort relatively to the supporting members 21.

Referring to Figures 7 and 5, one end of a retort may abut against rollers 23 which are supported on the retort setting while the opposite end of the retort is pressed by the resilient means shown in Figure 5, which means is vertically movable with respect to the adjacent setting as explained above.

In the modification shown in Figure 8 means are shown for applying a horizontal force to two compression blocks located adjacent an end wall of a retort by means of a single force mechanism. In this case a weighted lever mechanism (of the bell-crank type) is indicated in the drawings, but other means such as springs or hydropneumatic or pneumatic means or hydraulic means (cushioned by springs) may be used for applying the horizontal forces.

The modification shown in Figure 9 is similar to that shown in Figure 8 except that the compression blocks 7'' are slightly separated to allow for vertical expansion between such pairs of blocks.

In Figure 10 the side walls 3' of the retort are shown as having tongue and groove connections with the end walls 5' of the retort. The application of horizontal force (as indicated by the arrow) makes the tongue and groove connection tighter.

In Figure 11 portions of the two side walls of the retort are each integral with a portion of the end wall. The two portions of the end wall converge toward a tongue and groove joint. The force applied through the compression block tends to close this tongue and groove joint more tightly.

In the modification shown in Figure 12 the side walls of the retort are shown with a number of vertically disposed tongue and groove joints. Horizontal pressures are applied directly on these side walls by means of the terminal members 31 and 33. Horizontally directed pressure is also applied to the terminal block 32 which has a trapezoidal section. The pressure applied to the block 32 not only tends to close the joints in the side walls but tends also to close the vertically disposed joints in the end wall.

In the modification shown in Figure 13 a pair of retorts are shown as compressed against a common support. This arrangement economizes floor space.

Retorts may also be mounted in parallel as shown in Figure 14. The movable compression blocks 24 are indicated in a form desirable to prevent leakage of the combustion gases through the setting. Other means, however, may be provided for this purpose such as flexibly packed joints between the compression blocks and the wall of the retort setting to allow for the free movement of the compression blocks.

In the modification shown in Figure 15 hydraulic pressure is exerted on a piston 25 which in turn pushes on the compression block 7''' by means of the spring 26. The hydraulic pressure can also be cushioned by means of air in a hydropneumatic system.

In the modification shown in Figure 16 pneumatic pressure is exerted on the piston 27 which in turn pushes on the block 7'''.

In the modification shown in Figure 17 horizontal pressures are exerted on the side walls through terminal blocks 34. The joints in the end wall that run parallel to the length of the retort are sealed by means of loose packing in the chambers 35. Gravity forces this packing against the members 34 and causes a seal between the members 34 and the intermediate portion of the end wall and also between the members 34 and the adjacent retort setting.

As has been indicated above the walls of the retorts are made of a non-metallic refractory having a low coefficient of thermal expansion and a high degree of mechanical strength at high temperatures, such as bonded silicon carbide or recrystallized silicon carbide. Other refractories having a thermal conductivity greater than 0.006 calorie/cm.$^3$/sec./° C. may be used if they possess the required mechanical strength, resistance to spalling and chemical inertness. The walls of the retort setting can be made of fire-clay backed with steel beams as indicated in Figure 1 of the drawings.

While I have described several methods by which the invention may be applied to vertical retorts, the principle underlying these methods is applicable to a still wider range of retort types and arrangements with their associated settings. The drawings are intended to illustrate the practicability of the application of the invention in a variety of forms.

I claim:

1. In retorts having opposite side walls for heat transmission and supporting end walls, the method of reducing gas or vapor leakage which comprises subjecting the end walls to pressures tending to compress the side walls in a horizontal direction.

2. In a retort having opposite side walls for heat transmission and supporting end walls, resilient means for applying pressure to one or both of the end walls in a direction tending to compress the side walls horizontally.

3. A furnace for the heat treatment of materials comprising an elongated retort of rectangular horizontal cross section and having extended side walls for heat transmission from combustion chambers located on each side of the retort and having relatively narrow end walls joining said side walls, said end walls being unexposed to the combustion gases, an outer furnace wall surrounding the retort and the combustion chambers, said outer wall having a movable section adjacent one end of the retort, and means for pressing said movable section horizontally against the adjacent end of the retort.

4. A furnace for the heat treatment of materials comprising an elongated retort of rectangular horizontal cross section and having extended side walls for heat transmission from combustion chambers located on each side of the retort and having narrow end walls joining said side walls, said end walls being shielded from the combustion gases, an outer furnace wall surrounding the retort and the combustion chambers, said outer wall having a movable section of superimposed blocks adjacent one end of the retort, and a plurality of resilient members for pressing said blocks horizontally against the adjacent end of the retort.

5. A furnace for the heat treatment of materials comprising an elongated retort of rectangular horizontal cross section and having extended side walls for heat transmission from combustion chambers located on each side of the retort and having narrow end walls joining said side walls, said end walls being shielded from the combustion gases, a plurality of vertical joints in the side walls, and means for horizontally pressing the end walls to close said vertical joints in the side walls, said means comprising a plurality of superimposed blocks and a vertically disposed member which has bearings on a plurality of said blocks and which is urged horizontally in a direction to close said vertical joints in the side walls.

6. In the operation of non-metallic retorts having extended side walls for heat transmission to materials contained within the retort, the method of reducing leakage in the retort which comprises exerting horizontal forces on one or both of the end walls in a direction to close vertical joints in the side walls.

7. The furnace structure described in claim 4 in which the resilient compression mechanism is mounted for slidable movement in a vertical direction with respect to the outer wall of the furnace.

CLARENCE E. HAWKE.